(12) United States Patent
Hammoud et al.

(10) Patent No.: US 6,308,670 B1
(45) Date of Patent: Oct. 30, 2001

(54) SYSTEM AND METHOD FOR VALVE TIMING

(75) Inventors: Mazen Hammoud, Dearborn; Mohammad Haghgooie, Ann Arbor, both of MI (US)

(73) Assignee: Ford Global Tech., Inc.

( * ) Notice: Subject to any disclaimer, the term of this patent is extended or adjusted under 35 U.S.C. 154(b) by 0 days.

(21) Appl. No.: 09/611,119

(22) Filed: Jul. 6, 2000

(51) Int. Cl.$^7$ .................................................. F01L 1/34
(52) U.S. Cl. ........................ 123/90.15; 123/90.11; 123/406.29; 123/406.41; 123/406.43
(58) Field of Search ............................ 123/90.11, 90.12, 123/90.15, 90.16, 90.17, 90.18, 406.29, 406.41, 406.42, 406.43, 435, 436, 478

(56) References Cited

U.S. PATENT DOCUMENTS

| | | |
|---|---|---|
| 4,104,991 | 8/1978 | Abdoo . |
| 5,009,203 | 4/1991 | Seki . |
| 5,072,700 | 12/1991 | Kawamura . |
| 5,117,790 | 6/1992 | Clarke et al. . |
| 5,161,497 | 11/1992 | Simko et al. . |
| 5,255,637 | 10/1993 | Schechter . |
| 5,271,229 | 12/1993 | Clarke et al. . |
| 5,450,824 | 9/1995 | Yamane et al. . |
| 5,469,818 | 11/1995 | Yoshioka et al. . |
| 5,496,229 | 3/1996 | Miyamoto . |
| 5,626,109 | 5/1997 | Yasumura et al. . |
| 5,679,094 | 10/1997 | Nakamura et al. . |
| 5,845,613 | * 12/1998 | Yoshikawa ................... 123/90.15 |
| 6,135,086 | * 10/2000 | Clarke ............................ 123/316 |

* cited by examiner

Primary Examiner—Thomas Denion
Assistant Examiner—Jaime Corrigan
(74) Attorney, Agent, or Firm—Ford Global Tech., Inc.

(57) ABSTRACT

A valve timing system and method 10 is provided which automatically compensates for variations in the compression ratios of cylinders 12 of an internal combustion engine 30. Valve timing system 10 includes a controller 24 and actuators 26, 28 which selectively actuate valves 14, 16 in response to signals received from controller 24. In one embodiment, controller 24 is effective to cause each of the cylinders 12 to have a substantially uniform susceptibility to knock.

17 Claims, 3 Drawing Sheets

SYSTEM AND METHOD FOR VALVE TIMING

FIELD OF THE INVENTION

This invention relates to a system and method for valve timing and more particularly, a valve timing system and method which compensates for variation in the compression ratios of cylinders within a camless internal combustion engine, effective to provide uniform knock sensitivity among the cylinders.

BACKGROUND OF THE INVENTION

Valve timing systems and assemblies are used in internal combustion engines in order to alter the timing of the opening and closing of the engine's intake and/or exhaust valves. Prior valve timing systems typically include one or more camshafts and one or more cam timing assemblies which selectively advance and/or delay the rotation of the one or more camshafts relative to the crankshaft, thereby controlling the actuation of the intake and exhaust valves.

These prior systems and the valve timing profiles used by these systems suffer from several drawbacks. For example and without limitation, due to their inherent physical limitations, these prior cam-driven systems are ineffective to adjust or compensate for variations in the compression ratios of the various cylinders of a vehicle's engine. Due to manufacturing variability, the compression ratios of the various cylinders of many vehicle engines often vary significantly. The higher the compression ratio of a cylinder, the more susceptible that cylinder is to knock. Hence, many conventional engines have cylinders with varying susceptibility to knock. When one or more cylinders have a greater susceptibility to knock, the calibration of the ignition or "spark" system is typically retarded in order to prevent engine knock and excessive activation of the vehicle's knock control system. Particularly, due to the inability of these prior systems to independently adjust the valve timing of particular cylinders, the spark calibration of engines utilizing these prior cam-driven systems must be undesirably reduced.

Efforts have been made to increase the efficiency of vehicle engines and reduce emissions by eliminating the camshafts and operating the intake and exhaust valves by use of selectively controllable electromagnetic or electrohydraulic actuators. These types of systems eliminate many problems related to the physical characteristics of cam-driven systems and offer additional precision in valve timing. However, these prior systems are typically implemented using conventional valve timing profiles or strategies, and thus, suffer from many of the same previously delineated drawbacks associated with cam-driven systems. For example and without limitation, the valve timing profiles used within these systems and strategies cannot compensate for variation in the compression ratios of the various cylinders of the engine. As a result, the spark calibration of these engines is likewise undesirably reduced to prevent knocking and excessive activation of the engine's knock control system.

There is therefore a need for a new and improved system and method for valve timing for use with a camless engine including several cylinders having varying compression ratios.

SUMMARY OF THE INVENTION

It is a first object of the invention to provide a system and method for valve timing which overcomes at least some of the previously delineated drawbacks of prior systems, assemblies and methodologies, which is adapted for use with a camless internal combustion engine having several cylinders, and which is effective to compensate for variations in the compression ratios of the cylinders.

It is a second object of the invention to provide a valve timing system and method for use in combination with a camless internal combustion engine which is effective to provide substantially uniform cylinder knock sensitivity throughout the various cylinders of the engine.

It is a third object of the invention to provide a valve timing system and method for use within an engine which utilizes several electromagnetic or electrohydraulic valve actuating assemblies which are adaptively and independently controlled to provide uniform knock sensitivity among the various cylinders of the engine.

It is a fourth object of the invention to provide a method for valve timing which is effective to bias a particular cylinder within an engine to be more sensitive to knock that the other cylinders of the engine.

According to a first aspect of the present invention, a valve timing system is provided for use within a camless engine of the type including a first cylinder having a first valve and a first compression ratio, and a second cylinder having a second valve and a second compression ratio. The valve timing system includes a first actuator which selectively actuates the first valve; a second actuator which selectively actuates the second valve; and a controller which is communicatively coupled to the first and second actuators, the controller being effective to selectively communicate a first signal to the first actuator effective to actuate the first valve and a second signal to the second actuator effective to actuate the second valve, the controller being further effective to vary the first signal based upon the first compression ratio and to vary the second signal based upon the second compression ratio, thereby causing the first cylinder and the second cylinder to have a substantially similar susceptibility to knock.

According to a second aspect of the present invention, a valve timing method is provided for use within a camless engine including a plurality of cylinders each having at least one valve which is selectively actuated according to a unique timing profile. The method includes the steps of measuring a compression ratio for each of the plurality of cylinders; comparing the measured compression ratios; and altering at least one of the timing profiles based upon the comparison, effective to cause the plurality of cylinders have a substantially uniform sensitivity to knock.

These and other features, aspects, and advantages of the invention will become apparent by reading the following specification and by reference to the following drawings.

DETAILED DESCRIPTION OF THE PREFERRED EMBODIMENT OF THE INVENTION

Figure 1:
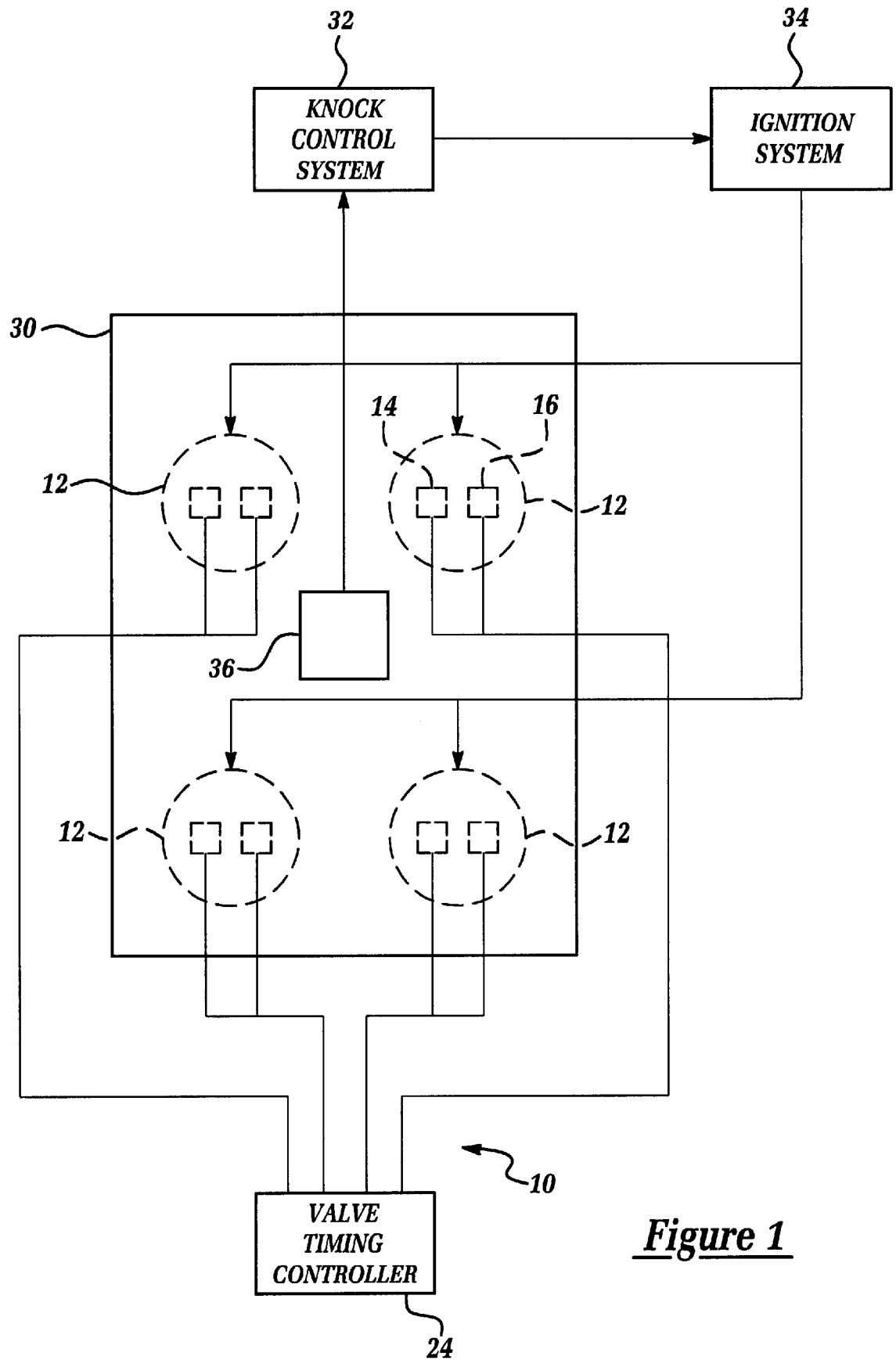
FIG. 1 is a block diagram of a valve timing system which is made in accordance with the teachings of the preferred embodiment of the invention and which compensates for variations in the compression ratios of cylinders within an internal combustion engine.
Figure 2:
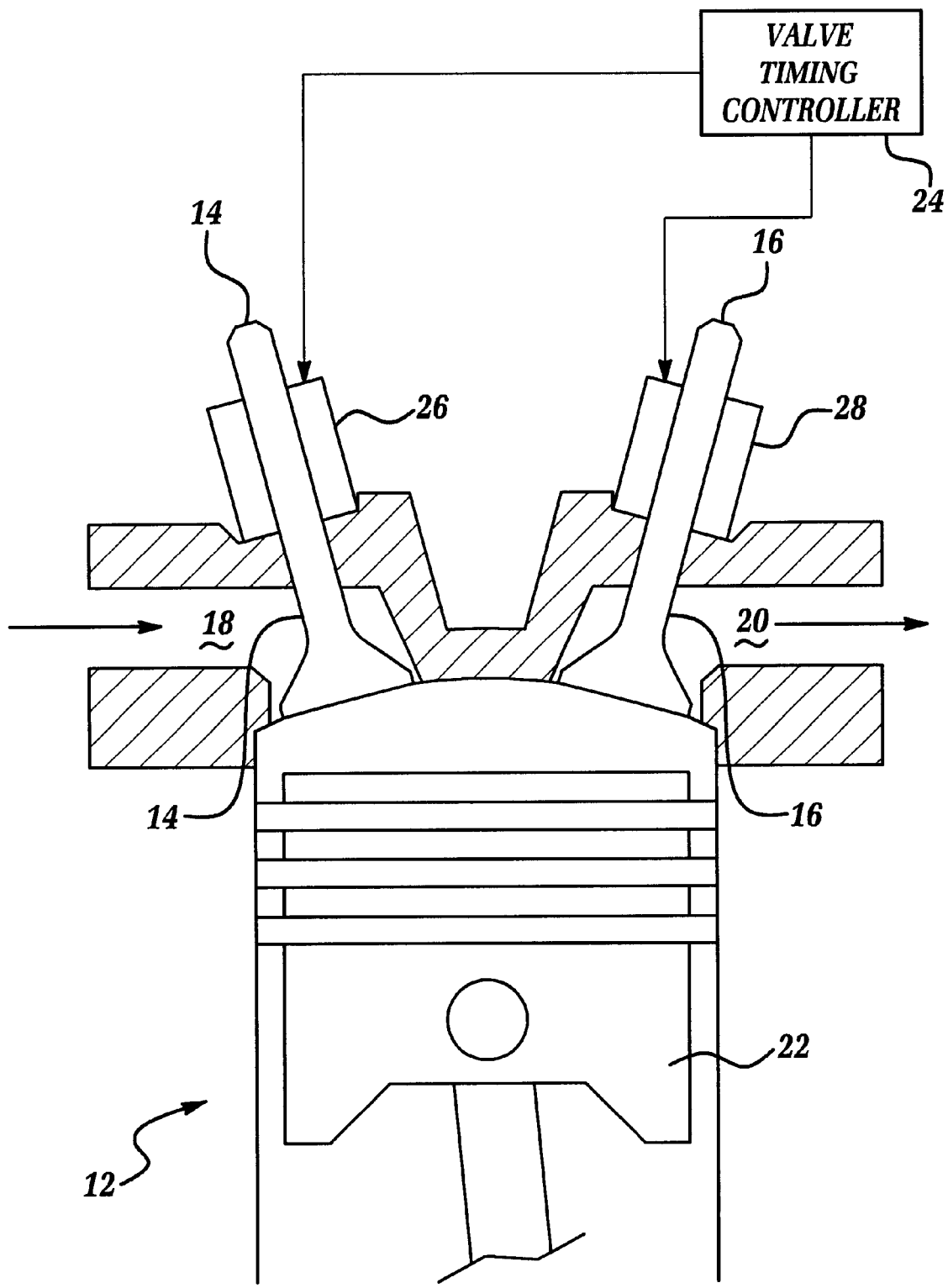
FIG. 2 is a schematic diagram of the valve timing system shown in FIG. 1.

Referring now to FIGS. 1 and 2, there is shown a valve timing system or assembly 10 which is made and utilized in accordance with the teachings of the preferred embodiment of the invention in order to compensate for variations in the compression ratios among the cylinders of an engine. Particularly, system 10 is adapted for use in combination with an internal combustion engine 30 having several substantially identical cylinders 12, and is effective to compensate for variations in the compression ratios of the cylinders 12. Each cylinder 12 includes one or more intake valves 14 which selectively deliver an air and fuel mixture to the cylinder 12 through intake port 18, one or more exhaust valves 16 which selectively discharge exhaust gasses from the cylinder 12 through discharge port 20, and a conventional piston 22 which is slidably disposed within cylinder 12. While an engine having four cylinders is illustrated in FIG. 1, it should be appreciated that the present system may be used in combination with other types of engines having different numbers of cylinders and/or valves.

Engine 30 further includes a conventional knock control system 32 which includes a conventional engine block-mounted sensor 36 which is effective to sense or measure engine noise and to communicate signals to knock control system 32 in response to such measurements. Knock control system 32 compares the received signals to one or more stored signals representing smooth (i.e., "knock-less") combustion in order to determine whether knocking is present within any of cylinders 12. Knock control system 32 is communicatively coupled to ignition system 34 and is effective to selectively vary the "spark" or ignition timing of the knocking cylinder(s) 12 by sending one or more control signals to ignition system 34, thereby suppressing knock within the cylinder(s) 12. Knock control system 32 may comprise a portion of a conventional engine control unit ("ECU") or a disparate chip, device or module externally coupled to the engine control unit.

System 10 includes a valve control unit or controller 24, a pair of actuators 26, 28 which are each electrically and communicatively coupled to controller 24. As discussed more fully and completely below, controller 24 determines which valves are to be actuated, when the respective valves are to be actuated, and the duration or period of time for which the respective valves are to be actuated according to a certain or predetermined valve timing strategy or profile.

In the preferred embodiment, controller 24 is a conventional controller including one or more microprocessors which cooperatively perform the below-described processes. In one alternate embodiment, controller 24 comprises a portion of a conventional engine control unit ("ECU"). In other alternate embodiments, controller 24 is externally coupled to the engine control unit. Controller 24 includes one or more stored valve timing strategies or profiles which it uses to control the timing of valves 14, 16.

Actuators 26, 28 are conventional electromagnetic valve actuators that receive signals from controller 24 and actuate valves 14 and 16 in response to the received signals. In one alternate embodiment, actuators 26, 28 comprise electrohydraulic actuators. It should be appreciated that in multi-cylinder engines, a unique actuator 26, 28 is utilized for each of the valves 14, 16, and each actuator 26, 28 is independently coupled to controller 24. In this manner, each of valves 14, 16 may be selectively and independently controlled by controller 24.

Figure 3:
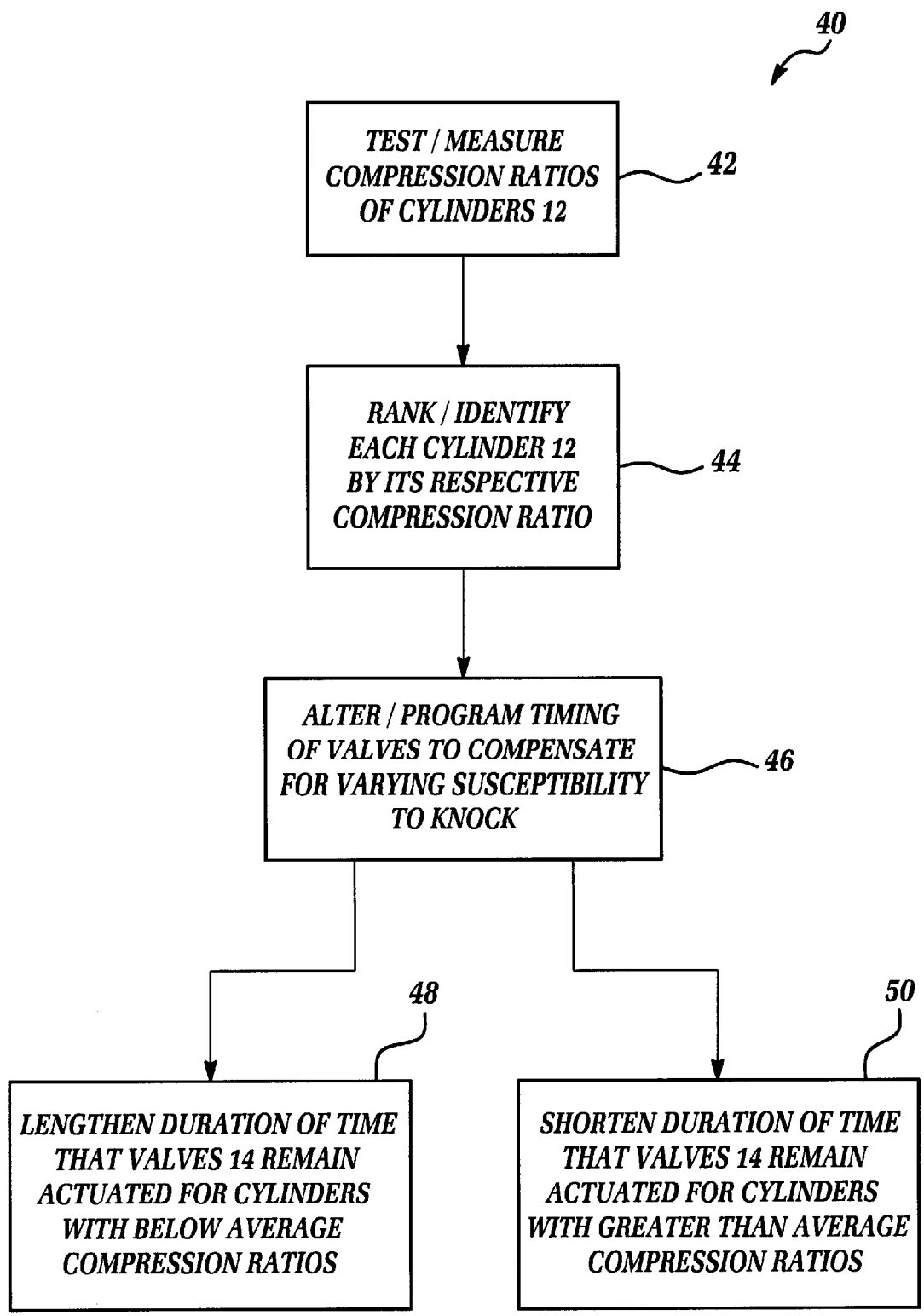
FIG. 3 is a block diagram illustrating a method used by the preferred embodiment of the present invention to compensate for the varying compression ratios within the cylinders of an engine.

In operation, the compression ratios of the individual cylinders 12 are used to alter and/or generate the timing profiles of valves 14, 16 for each cylinder 12 in order to provide a substantially uniform or similar sensitivity to knock tendency among the cylinders 12. Referring now to FIG. 3, there is shown a block diagram 40 which illustrates one non-limiting embodiment of a method used by the present system 10 to compensate for the varying compression ratios of cylinders 12. The method begins with functional block or step 40, in which the compression ratio for each cylinder 12 is calculated and/or determined in a conventional manner (e.g., by conventional testing procedures and/or measurements). Each cylinder 12 is then "ranked" or identified according to its respective compression ratio, as shown in functional block or step 44.

The compression ratio data is then used to program and/or alter the valve timing profiles and/or strategies used within valve timing controller 24, as shown in functional block or steps 46, 48 and 50. Specifically, controller 24 modifies the desired or conventional valve timing profile in order to compensate for the varying compression ratios, and thus, the varying susceptibility to knock of the cylinders 12.

Controller 24 alters (i.e., lengthens or reduces) the duration or period of time that valves 14, 16 are to remain in an actuated or "open" position and/or the time that the valves are actuated relative to each other and/or relative to the stroke of piston 22. In the non-limiting embodiment shown in FIG. 3, controller 24 selectively reduces or increases the amount of air and fuel (i.e., the "air charge mass") that is introduced into each of the cylinders 12, based upon each cylinder's compression ratio or susceptibility to knock. For example and without limitation, as shown in functional block: or step 50, for cylinders that are more susceptible to knock (i.e., cylinders having a greater than the average or standard compression ratio), controller 24 alters the signals transmitted to the actuators 26 of those cylinders effective to selectively shorten the duration or period of time that each of the valves 14 within those cylinders remains actuated or "open". This shortened actuation of valve 14 reduces the amount of air and fuel that is introduced into the cylinder 12, thereby reducing the susceptibility to knock of the cylinder 12. In the preferred embodiment of the invention, the amount that the actuation of each valve 14 is shortened is proportional to and/or based upon the amount by which the compression ratio of the respective cylinder exceeds an average compression ratio value. In this manner, the susceptibility to knock of each of the cylinders 12 having a greater than average compression ratio is made approximately equal to an average susceptibility value.

In step 48, controller 24 alters the signals transmitted to the actuators 26 of cylinders that are less susceptible to knock (i.e., cylinders having lesser than the average or standard compression ratio), effective to selectively lengthen the duration or period of time that each of the valves 14 within those cylinders remains actuated or "open". This prolonged actuation of valve 14 increases the amount of air and fuel that is introduced into the cylinder 12, thereby increasing the susceptibility to knock of the cylinder 12 to an average or standard valve. In the preferred embodiment of the invention, the amount by which the actuation of each valve 14 is prolonged is proportional to and/or based upon the amount that the compression ratio of the respective cylinder falls below an average compression ratio value. Hence, the susceptibility to knock of each of the cylinders 12 having a below average compression ratio is made approximately equal to the average susceptibility value. In this manner, the present system 10 causes the susceptibility to knock of each of the cylinders 12 to be equal to approximately the same average or standard value, thereby providing substantially uniform or similar knock sensitivity through engine 30. Hence, the present system allows for "tighter" or increased spark calibration relative to prior systems and decreased activation of the knock control system 32.

In an alternate embodiment, procedures in steps 48 and 50 are replaced with or performed in addition to other steps which alter the timing of valves 14 and/or 16 to increase or decrease the amount of residual gas within cylinders 12. Particularly, in this alternate embodiment, controller 24 alters the susceptibility of cylinders 12 to knock by selectively increasing or reducing the amount of residual gas that remains within cylinders 12 after a firing event. In this non-limiting embodiment, controller 24 alters the signals transmitted to the actuators 28 of the cylinders that are more susceptible to knock (i.e., cylinders having a greater than the average or standard compression ratio) effective to selectively alter the timing of valves 14 and/or 16 to increase internal residual gas within the cylinders. This increase in the amount of residual gas that remains within cylinders 12 after a firing event decreases the susceptibility to knock of the cylinders 12. The timing of valves 14 and/or 16 may be altered in a variety of manners to achieve the desired increase in residual gas, including the following non-limiting examples. In one non-limiting embodiment, the timing of intake valve 14 is adjusted to cause valve 14 to open "late", thereby increasing the amount of residual gas within cylinder 12. In another non-limiting embodiment, valve 16 is held open (i.e., actuated) for a shorter duration or period of time after a firing event, thereby causing more of the residual gas to remain within cylinder 12. In another alternate embodiment, the amount of valve "overlap" (i.e., the amount of time that both valves are at least partially open) is selectively decreased to increase the amount of residual gas within cylinder 12.

Controller 24 also alters the signals transmitted to the actuators 28 of the cylinders that are less susceptible to knock (i.e., cylinders having a greater average or standard compression ratio) effective to selectively decrease internal residual gas by altering the timing of valves 14 and/or 16. This reduction in the amount of residual gas that remains within cylinders 12 after a firing event increases the susceptibility to knock of the cylinder 12. The timing of valves 14 and/or 16 may be altered in a variety of manners to achieve the desired decrease in residual gas including the following non-limiting examples. In one non-limiting embodiment, the timing of intake valve 14 is adjusted to cause valve 14 to open "early", thereby decreasing the amount of residual gas within cylinder 12. In another non-limiting embodiment, valve 16 is held open (i.e., actuated) for a longer duration or period of time after a firing event, thereby causing less residual gas to remain within cylinder 12. In another alternate embodiment, the amount of valve "overlap" (i.e., the amount of time that both valves are at least partially open) is selectively increased to decrease the amount of residual gas within cylinder 12. In this manner, this alternate embodiment causes the susceptibility to knock of each of the cylinders 12 to be equal to approximately the same average or standard value.

In a second embodiment of the present system 10, controller 24 is programmed to bias one of cylinders 12 to have a greater susceptibility to knock than the other cylinders 12, based on the function and/or location of sensor 36. Due to the physical location and/or characteristics of block-mounted knock sensor 36 which senses vibrations transmitted through the engine block structure, the knock control system 32 can typically sense the presence of knock in one of the cylinders 12 before the other cylinders 12. Particularly, since only one sensor 36 is used for all cylinders 12, the location of the sensor 36 relative to each cylinder 12, causes some knocking cylinders to be better or more easily detected than others. In this embodiment, the engine 30 is first tested to determine in which of cylinders 12 is knocking best or most easily detected by sensor 36. The engine 30 may be tested in a conventional manner by intentionally inducing knock in the various cylinders 12 while taking measurements with sensor 36.

Once the "best" or most easily detected cylinder is identified, controller 24 is programmed to bias that cylinder to have the greatest susceptibility to knock, based upon the compression ratios of the cylinders, which are measured or determined in a conventional manner. Controller 24 biases the "best-detected" cylinder using the previously delineated methods by altering (i.e., lengthening and/or reducing) the duration or period of time that either one or both of valves 14, 16 of the cylinder remain in an actuated or "open" position and/or the time that the valves 14, 16 are actuated relative to each other and/or relative to the stroke of piston 22. In the preferred embodiment, once the "best-detected" cylinder is biased to be more susceptible to knock than the remaining cylinders, the valve timing of the remaining cylinders are adjusted, in a manner substantially similar to the procedure described in method 30, effective to cause the susceptibility to knock of the remaining cylinders to be substantially uniform or similar.

In this manner, the system ensures that the cylinder 12 that is best or most easily detected by the knock sensor 36 is most susceptible to knock. This substantially eliminates the risk of "undetected" knock occurring within cylinders 12, since the cylinder in which knocking is most likely to occur first is the cylinder best detected by sensor 36. This allows ignition system 34 to be calibrated more tightly or aggressively for fuel economy benefits, since the risk of engine damage as a result of undetected knock is substantially reduced or eliminated.

The methodologies described herein can be selectively used and implemented over the life of engine 30 to adaptively equalize the knock tendencies of cylinders 12. Particularly, engine 30 can be tested from time to time to determine and/or measure the knock sensitivities of the various cylinders 12. Based upon the results of the testing, the valve timing strategies or profiles within controller 24 can be altered or reprogrammed to maintain uniformity in the knock tendencies among cylinders 12. For example and without limitation, the foregoing methods of altering the timing of valves 14, 16 (e.g., selectively shortening and lengthening the duration or period of time that valves 14, 16 remain open) can be used to maintain uniformity in the knock tendencies of cylinders 12, which may change over time due to deposits that are formed in the various combustion chambers.

It is to be understood that the invention is not to be limited to the exact construction and/or method which has been illustrated and discussed above, but that various changes and/or modifications may be made without departing from the spirit and the scope of the invention.

What is claimed is:

1. A valve timing method for use within a camless engine including a plurality of cylinders each having at least one valve which is selectively actuated according to a unique timing profile, said method comprising the steps of:

measuring a compression ratio for each of said plurality of cylinders;

comparing said measured compression ratios; and altering at least one of said timing profiles based upon said comparison, effective to cause said plurality of cylinders to have a substantially uniform sensitivity to knock.

2. The valve timing method of claim 1 wherein plurality of cylinders includes a first cylinder having at least one intake valve which is selectively open for a certain period of time, effective to allow an amount of air and fuel to enter said first cylinder, said method comprising the steps of:

determining whether said first cylinder has a compression ratio which is greater than a first value; and if said first cylinder has a compression ratio which is greater than said first value, selectively decreasing said certain period of time, effective to decrease said amount of air and fuel, which enters said first cylinder, thereby causing said first cylinder to be less susceptible to knock.

3. The method of claim 2 further comprising the steps of:

determining whether said first cylinder has a compression ratio which is less than a first value; and if said first cylinder has a compression ratio which is less than said first value, selectively increasing said certain period of time, effective to increase said amount of air and fuel that enters said first cylinder, thereby causing said first cylinder to be more susceptible to knock.

4. The method of claim 3 wherein said first value comprises an average compression ratio value among said plurality of cylinders.

5. The method of claim 1 wherein said plurality of cylinders includes a first cylinder having at least one exhaust valve which is selectively open for a certain period of time, effective to allow residual gas escape from said first cylinder after a firing event, said method comprising the steps of:

determining whether said first cylinder has a compression ratio which is greater than a first value; and if said first cylinder has a compression ratio which is greater than said first value, selectively decreasing said certain period of time, effective to increase residual gas which remains within said cylinder after a firing event, thereby causing said first cylinder to be less sensitive to knock.

6. The method of claim 5 further comprising the steps of:

determining whether said first cylinder has a compression ratio which is less than a first value; and if said first cylinder has a compression ratio which is less than said first value, selectively increasing said certain period of time, effective to decrease residual gas which remains within said cylinder after a firing event, thereby causing said first cylinder to be more sensitive to knock.

7. A valve timing system for use within a camless engine of the type including a first cylinder having a first valve and a first compression ratio, and a second cylinder having a second valve and a second compression ratio, said valve timing system comprising:

a first actuator which selectively actuates said first valve;

a second actuator which selectively actuates said second valve; and a controller which is communicatively coupled to said first and second actuators, said controller being effective to selectively communicate a first signal to said first actuator effective to actuate said first valve and a second signal to said second actuator effective to actuate said second valve, said controller being further effective to vary said first signal based upon said first compression ratio and to vary said second signal based upon said second compression ratio, thereby causing said first cylinder and said second cylinder to have a substantially similar susceptibility to knock.

8. The valve timing system of claim 7 wherein said first and second actuators comprise electromagnetic actuators.

9. The valve timing system of claim 7 wherein said first and second valves comprise intake valves.

10. The valve timing system of claim 7 wherein said first and second valves comprise exhaust valves.

11. The valve timing system of claim 7 wherein said first actuator is effective to actuate said first valve for a first duration of time in which a first amount of air and fuel enters said first cylinder and wherein said controller is effective to selectively shorten said first duration of time, thereby selectively reducing the susceptibility to knock of said first cylinder.

12. The valve timing system of claim 10 wherein said first actuator is effective to actuate said first valve for a first duration of time effective to cause a certain amount of residual gas to escape from said first cylinder and wherein said controller is effective to selectively shorten said certain duration of time, thereby reducing the susceptibility to knock of said first cylinder.

13. The valve timing system of claim 7 wherein said controller is effective to cause said first cylinder and said second cylinder to have a susceptibility to knock which is substantially equal to an average value.

14. A method for valve timing for use with a camless engine of the type including a plurality of cylinders each having a certain valve timing profile, and a knock sensor which is effective to detect knock in each of said plurality of cylinders, said method comprising the steps of:

determining a unique one of said plurality of cylinders in which said sensor can most easily detect knock;

measuring a compression ratio for each of said plurality of cylinders; and selectively altering said certain timing profile of said unique one of said plurality of cylinders based upon said measured compression ratios, said alteration being effective to cause said unique one of said plurality of cylinders to be most susceptible to knock, thereby substantially preventing undetected knock within said engine.

15. The method of claim 14 wherein said knock sensor comprises an engine block-mounted sensor.

16. The method of claim 14 wherein said unique one of said plurality of cylinders includes an intake valve which is selectively open for a certain period of time, effective to allow a charge of air and fuel to enter said unique one of said plurality of cylinders, said method further comprising the steps of:

increasing said certain period of time, effective to increase said charge of air and gas, thereby causing said unique one of said cylinders to be more susceptible to knock.

17. The method of claim 14 wherein said unique one of said plurality of cylinders includes an exhaust valve which is selectively open for a certain period of time, effective to allow residual gas within said unique one of said plurality of cylinders to escape, said method further comprising the steps of:

increasing said certain period of time, effective to decrease the amount of residual gas within said unique one of said plurality of cylinders, thereby causing said unique one of said plurality of cylinders to be more susceptible to knock.

* * * * *